Patented May 17, 1949

2,470,168

UNITED STATES PATENT OFFICE 2,470,168

POLYMERIC 4-VINYLCYCLOHEXENE DIOXIDE COMPOSITIONS

Walter John Hornibrook, McMasterville, Quebec, Canada, assignor to Canadian Industries Limited, Montreal, Quebec, Canada, a corporation of Canada No Drawing. Application February 20, 1948, Serial No. 9,970. In Canada May 30, 1947

13 Claims. (Cl. 260—17)

1

This invention relates to new polymeric 4-vinylcyclohexene dioxide compositions and to their preparation.

4-vinylcyclohexene dioxide is prepared, according to copending U. S. application Serial No. 743,198, filed April 22, 1947 in the names of O. C. W. Allenby and G. J. Harris, by reacting 4-vinylcyclohexene with hypochlorous acid to form 4-vinylcyclohexene dichlorhydrins and by dehydrohalogenating the dichlorhydrins to obtain the dioxide. In copending U. S. applications Serial No. 766,453, filed August 5, 1947 in the name of O. C. W. Allenby and Serial No. 766,455, filed August 5, 1947 now Patent No. 2,460,195 in the name of G. H. Segall, there are disclosed homopolymers of 4-vinylcyclohexene dioxide together with processes for preparing those polymers which comprise heating 4-vinylcyclohexene dioxide with various polymerization catalysts.

These polymers of 4-vinylcyclohexene dioxide are adapted for a wide variety of uses. However, for certain purposes, the unmodified polymers are not entirely suited despite their possession of some highly advantageous properties. This is particularly true in the use of these polymers as coatings and films where there is considerable room for improvement in the flexibility of the polymers.

An object of the present invention is to provide a new polymeric 4-vinylcyclohexene dioxide composition and a process of preparing same. A further object is to provide new polymeric compositions having greater flexibility than unmodified polymeric 4-vinylcyclohexene dioxide. A further and more specific object is to provide a polymeric 4-vinylcyclohexene dioxide composition particularly adapted for use in films and castings. Other objects will be apparent from the description of the invention given hereinafter.

The above objects are accomplished according to the present invention by mixing 4-vinylcyclohexene dioxide with a cellulose ester and then polymerizing the 4-vinylcyclohexene dioxide. Preferably, the proportion of cellulose ester should be at least 5%, by weight of the 4-vinylcyclohexene dioxide, and should not exceed that amount which will form a compatible mixture with the 4-vinylcyclohexene dioxide. To increase the proportion of cellulose ester that will remain in compatible admixture, a volatile organic solvent may be used.

The invention may be carried out by dissolving a cellulose ester in 4-vinylcyclohexene dioxide, with or without the aid of a volatile organic solvent such as acetone. A plasticizer for the cellulose ester, up to 100% by weight of the cellulose ester, may optionally be added. A polymerization catalyst is then added to the solution which is maintained at a temperature of 20° C. to 110° C. until polymerization is substantially complete. If a catalyst is unstable, it may be necessary to cool the solution down to a relatively low temperature before adding the catalyst and then slowly raising the temperature. To illustrate, perchloric acid is a highly preferred polymerization catalyst and yet it is relatively unstable so that the solution is normally cooled to a temperature of 0° C. to —20° C. before the perchloric acid is added and then the solution is slowly heated, preferably up to a temperature of about 85° C. to 90° C. which temperature is maintained until polymerization is complete. Where stable polymerization catalysts such as boric acid or zinc chloride are used, the cooling step is not necessary.

The following examples, in which all proportions are given by weight unless otherwise specified, illustrate specific embodiments of the invention.

Example I

A 5% solution of cellulose acetate in 4-vinylcyclohexene dioxide was prepared by dissolving 5 parts of commerical acetone-soluble cellulose acetate sheet reprecipitated from acetone, in 95 parts of 4-vinylcyclohexene dioxide. 100 Parts of this solution were then cooled to 0° C. and 0.15 part of perchloric acid as a 9% solution in acetic acid was added thereto. The resulting solution was afterwards heated slowly up to 90° C. and maintained at this temperature. A colorless gel was obtained after one hour which hardened to a hard polymer within 24 hours.

Example II

To 100 parts of a 5% solution of cellulose acetate in 4-vinylcyclohexene dioxide, prepared as in Example I, there was added 2.4 parts of dioctylphthalate as plasticizer, i. e., an amount of plasticizer equal to about 50% of the weight of the cellulose acetate present in the reaction mixture. The solution was cooled to 0° C. and 0.15 part of perchloric acid as a 9% solution in acetic acid was added. The mixture was then slowly heated to 90° C. After one hour heating, a gel was obtained which, with continued heating, polymerized within 24 hours to a hard solid.

Example III

A 10% solution of cellulose acetate in 4-vinylcyclohexene dioxide was prepared by dissolving 10 parts of reprecipitated commerical cellulose acetate in 160 parts acetone, adding 90 parts of 4-vinylcyclohexene dioxide, filtering through sintered glass and evaporating the acetone. 100 parts of this solution were then cooled to 0° C. and 0.15 part of perchloric acid as a 9% solution in acetic acid was added. After the temperature of the reaction mixture had been slowly raised up to 85° C. and maintained at this temperature, a gel was obtained which polymerized to a hard solid after 2 hours.

*Example IV*

A 5% solution of cellulose nitrate in 4-vinylcyclohexene dioxide was prepared by dissolving 5 parts of cellulose nitrate in 95 parts of 4-vinylcyclohexene dioxide. 100 parts of this solution were then cooled to 0° C. and 0.15 part of perchloric acid as a 9% solution in acetic acid was added. The reaction mixture was heated slowly up to 90° C. and held at this temperature. It polymerized within one hour to a clear, hard and almost colorless solid.

*Example V*

A 10% solution of cellulose nitrate in 4-vinylcyclohexene dioxide was prepared by dissolving 10 parts of cellulose nitrate in 90 parts of 4-vinylcyclohexene dioxide. 100 parts of this solution were then treated as in Example IV. After 2 hours' heating at 90° C. a clear, hard, slightly yellow polymer was obtained.

*Example VI*

100 parts of a 10% solution of cellulose nitrate in 4-vinylcyclohexene dioxide prepared as in Example V were mixed with 5 parts of dioctyl phthalate as plasticizer, i. e., an amount of plasticizer equal to about 50% of the weight of the cellulose nitrate present in the reaction mixture. The solution was then cooled to 0° C. and thereafter treated as in Example IV. After one hour of heating at 90° C. a clear, hard and slightly yellow polymer was obtained.

*Example VII*

A 20% solution of cellulose nitrate in 4-vinylcyclohexene dioxide was prepared by dissolving 20 parts of cellulose nitrate in 80 parts of 4-vinylcyclohexene dioxide. 100 parts of this solution were then treated as in Example IV. Within one hour heating at 90° C. there was obtained an extremely hard, clear and transparent polymer.

*Example VIII*

To 100 parts of a 20% solution of cellulose nitrate in 4-vinylcyclohexene dioxide, prepared as in Example VII, there were added 10 parts of dioctyl phthalate as a plasticizer (about 50% of the weight of the cellulose nitrate present in the reaction mixture). The solution was then cooled at 0° C. and further treated as in Example IV. A very hard polymer was obtained after one hour heating at 90° C.

It will be understood that the above examples are merely illustrative and that the invention broadly comprises polymerizing 4-vinylcyclohexene dioxide admixed with a cellulose ester, the proportion of cellulose ester preferably being such that it is in compatible admixture with the 4-vinylcyclohexene dioxide.

The invention comprises mixing the 4-vinylcyclohexene dioxide with cellulose esters broadly. Preferred esters, in addition to cellulose acetate and nitrate, include cellulose propionate, butyrate, acetopropionate, and acetobutyrate, but other cellulose esters may be used.

A minimum proportion of at least 5%, by weight of the 4-vinylcyclohexene dioxide, of the cellulose ester is desirable in order to gain substantial advantage from the present invention. The limiting factor on the maximum proportion of cellulose ester is the compatibility of the ester with 4-vinylcyclohexene dioxide, i. e., the amount of the ester which will dissolve in the 4-vinylcyclohexene dioxide. As shown in Example III, the amount of cellulose ester compatible with the 4-vinylcyclohexene dioxide may be increased by the use of volatile solvents which may be evaporated off prior to disposing the composition in a mold or the like to be polymerized into a solid body. As cellulose nitrate is soluble in 4-vinylcyclohexene dioxide in any proportion that would be practical to use, the employment of an auxiliary solvent for increasing the compatible proportion of this ester would be unnecessary.

Even where the use of an auxiliary solvent is not necessary to increase the compatibility of the cellulose ester with the 4-vinylcyclohexene dioxide, it may be advantageous to use a volatile organic solvent such as acetone for the purpose of reducing the viscosity of the solution to facilitate handling it in mechanical operations such as pouring into molds. Although the compatibility of certain cellulose esters, particularly cellulose nitrate, might permit the use of a higher proportion while still obtaining a compatible mixture with the 4-vinylcyclohexene dioxide, nevertheless the use of a proportion of cellulose ester substantially greater than 25%, by weight of the 4-vinylcyclohexene dioxide, is normally not practical.

Although the foregoing examples were all restricted to the use of perchloric acid as polymerization catalyst, other polymerization catalysts are suitable for the operation of this invention. Suitable examples of such compounds are the catalysts used for the polymerization of 4-vinylcyclohexene dioxide, as described in the aforementioned U. S. applications Serial Nos. 766,453 and 766,455. Those comprise periodic acid, chloric acid, iodic acid, boric acid, ferric chloride, aluminum chloride, zinc chloride, stannic chloride, boron trichloride, silicon tetrachloride, phosphorous trichloride, arsenic trichloride, antimony trichloride, boron trifluoride, arsenious oxide, antimony trioxide, phosphorus trioxide, trimethylamine, sodium methoxide, trimethyl borate, dihydroxyfluoroboric acid, sodium perborate and benzoyl peroxide.

The proportion of catalyst will be based on the 4-vinylcyclohexene dioxide without regard to the cellulose ester present. The precise proportion of catalyst is not a critical factor in the instant invention and may vary anywhere from 0.0001% to 10% by weight of the 4-vinylcyclohexene dioxide but normally the catalyst will be used in the range of 0.02% to 2%.

Polymerization of the 4-vinylcyclohexene dioxide may be effected at any temperature from 20° C. to 110° C. although generally a temperature of 85° C. to 90° C. has been found most favorable. At lower temperatures the duration of the polymerization period is, of course, appreciably extended and at higher temperatures some difficulty may be encountered in controlling the polymerization reaction. Despite this, temperatures as high as 110° C. may be used successfully, particularly where relatively thin films are being prepared. Obviously, the polymerization period is continued until substantially complete polymerization of the 4-vinylcyclohexene dioxide is effected.

Plasticizers other than the dioctyl phthalate shown in the examples may be used, particularly those plasticizers which are usually selected for cellulose esters provided they are compatible with 4-vinylcyclohexene dioxide. Among such plasticizers are diethyl phthalate, dibutyl phthalate, diamyl phthalate, tricresyl phosphate, tributyl phosphate, butyl stearate, and similar conventional cellulose ester plasticizers. A proportion of plasticizer up to 100% or even more, by weight of the cellulose ester, may be used but it is preferred not to exceed 50% plasticizer as little benefit is obtained by increasing the proportion of plasticizer further.

The polymeric compositions of this invention are adapted for a wide variety of uses. Due to their relative flexibility and lack of brittleness, coatings and films of these compositions are particularly valuable. However, as cast polymers, these compositions are useful for a great number of other purposes.

As many apparently widely different embodiments of this invention may be made without departing from the spirit and scope thereof, it is to be understood that the invention is not limited to the specific embodiments thereof except as defined in the appended claims.

I claim:

1. Process of preparing a polymeric composition which comprises forming a compatible mixture of 4-vinylcyclohexene dioxide and at least 5%, by weight of said 4-vinylcyclohexene dioxide, of a cellulose ester and maintaining said mixture at a temperature of 20° C.–110° C. in the presence of a polymerization catalyst until said 4-vinylcyclohexene dioxide is substantially completely polymerized.

2. Process as set forth in claim 1 wherein said mixture is maintained at a temperature of 85° C.–90° C. until said 4-vinylcyclohexene dioxide is substantially completely polymerized.

3. Process as set forth in claim 1 wherein said cellulose ester is cellulose nitrate.

4. Process as set forth in claim 1 wherein said cellulose ester is cellulose acetate.

5. Process of preparing a polymeric composition which comprises forming a mixture of, by weight, 80 to 95 parts of 4-vinylcyclohexene dioxide and 5 to 20 parts of cellulose nitrate and maintaining said mixture at a temperature of 20° C.–110° C. in the presence of a polymerization catalyst until said 4-vinylcyclohexene dioxide is substantially completely polymerized.

6. Process of preparing a polymeric composition which comprises forming a mixture of, by weight, 90 to 95 parts of 4-vinylcyclohexene dioxide and 5 to 10 parts of cellulose acetate and maintaining said mixture at a temperature of 20° C.–110° C. in the presence of a polymerization catalyst until said 4-vinylcyclohexene dioxide is substantially completely polymerized.

7. Process of preparing a polymeric composition which comprises forming a compatible mixture of 4-vinylcyclohexene dioxide and at least 5%, by weight of said 4-vinylcyclohexene dioxide, of a cellulose ester, cooling said mixture to 0° C. and adding perchloric acid as a polymerization catalyst thereto, heating said mixture to 85° C.–90° C., and maintaining said mixture at 85° C.–90° C. until said 4-vinylcyclohexene dioxide is substantially completely polymerized.

8. A polymeric composition comprising 4-vinylcyclohexene dioxide polymerized in compatible admixture with at least 5%, by weight of said 4-vinylcyclohexene dioxide, of a cellulose ester.

9. A polymeric composition as recited in claim 8 wherein said cellulose ester is cellulose nitrate.

10. A polymeric composition as recited in claim 8 wherein said cellulose ester is cellulose acetate.

11. A composition adapted to be polymerized and comprising monomeric 4-vinylcyclohexene dioxide in compatible admixture with at least 5%, by weight of said 4-vinylcyclohexene dioxide, of a cellulose ester.

12. A composition as recited in claim 11 wherein said cellulose ester is cellulose nitrate.

13. A composition as recited in claim 11 wherein said cellulose ester is cellulose acetate.

WALTER JOHN HORNIBROOK.

No references cited.